UNITED STATES PATENT OFFICE.

ADOLF GENTZSCH, OF VIENNA, AUSTRIA-HUNGARY.

INSULATING COMPOSITION AND METHOD OF PRODUCING SAME.

SPECIFICATION forming part of Letters Patent No. 699,383, dated May 6, 1902.

Application filed August 30, 1901. Serial No. 73,798. (No specimens.)

*To all whom it may concern:*

Be it known that I, ADOLF GENTZSCH, a subject of the Emperor of Austria-Hungary, residing at Vienna, Austria-Hungary, have invented certain new and useful Improvements in Insulating Compositions and Methods of Producing the Same, of which the following is a specification.

My invention has relation to the compounding of a plastic or similar composition for insulating electrical articles or appliances in the application of the same thereto; and in such connection it relates to the employment of certain defined materials and in the mixing or compounding of the same.

Gutta-percha consists, mainly, of a wax-like body, a product of rubber sap, (rubber or caoutchouc,) and a species of resin, with the addition of oils. Attempts have been made to produce artificial or imitation gutta-percha, and experiments have demonstrated that only solutions of the components of natural gutta-percha could be combined, and hence the attempts to make such a product have been attended with little success. Moreover, it is impossible to melt gum-rubber or caoutchouc without losing all its valuable properties, for the reason that if heated in the open it simply burns, while if heated in a pan or other similar appliance it yields an oily substance designated as "caoutchouc" or "rubber-oil," with the attending loss of all the valuable qualities of the rubber completely gone as a result.

According to my invention, as extended practice has demonstrated, if gum-rubber or caoutchouc be mixed with a vegetable wax, such as palm or carnauba wax, and the mass is subjected to an intimate kneading operation while exposed initially to a mild heat, which is thereafter increased, a product is obtained having all the properties of natural gutta-percha and in a form or condition especially adapted for forming an efficient and reliable insulating composition for covering electrical articles or appliances and, moreover, a composition covering which is not affected by heat of a passing current or by atmospheric or other somewhat similar conditions. Again, a product or insulating composition is obtained in which a solvent is not required for either the gum-rubber or the other ingredients entering into the composition in the mixing or compounding and kneading of the mass in production of the same.

My invention, stated in general terms, consists of an insulating composition as a covering for electrical articles or appliances and in the method of producing the same, substantially as hereinafter described and claimed.

In preparing or compounding my insulating composition I have found in practice that good results are obtained by the employment of the following ingredients, according to the specified formulas, of, first, twenty parts, by weight, of vegetable wax, such as palm or carnauba wax, twenty parts, by weight, of resin, (asphaltum, colophony, or shellac,) ten parts, by weight, of oil, (olive-oil, common or thickened, according to the United States patent of A. Gentzsch, No. 538,828, of May 7, 1895,) fifty parts, by weight, of gum-rubber, or, second, sixty parts, by weight, of vegetable wax (carnauba or palm wax or resin, the melting point of which has been raised according to the method of the A. Gentzsch United States Patent No. 657,696, of September 11, 1900,) and forty parts, by weight, of gum-rubber. The gum-rubber or caoutchouc and vegetable wax, such as palm or carnauba wax, either with resin, asphaltum, colophony, or shellac and oil, such as olive-oil, mixed or combined therewith, are kneaded together in a suitably-heated kneading-machine, the initial heat of the mass therein being a mild one and during the operation may be increased up to 100° centigrade, more or less.

As is well known, gum-rubber or caoutchouc in its natural state is stringy and elastic; but by incorporating with it the vegetable wax, such as palm or carnauba wax, by the intimate kneading operation described the elastic, tough, and stringy nature of the rubber is replaced by a plastic composition which has all the appearances as well as properties of the natural gutta-percha before the same has been hardened. The use of resin, colophony, asphaltum, and oils while not essential is deemed, however, preferable, for the reason that said materials are cheaper than palm or carnauba wax. For that reason instead of using sixty parts of the wax and forty parts of the rubber the proportions hereinbefore given, in which colophony and the other substances mentioned are used with only twenty parts of wax, would be preferable from the point of cheapness. When oils are employed under the first formula herein given, the same should be added to the mass before the starting of malaxation, and the kneading operation under either formula of treatment of the ingredients entering into the composition is continued until samples taken therefrom show reliable uniformity in the resultant product, which can be readily ascertained from tests made or taken therefrom.

Having thus described the nature and object of my invention, what I claim as new, and desire to secure by Letters Patent, is—

1. An insulating composition consisting of gum-rubber or caoutchouc and a vegetable wax kneaded together under a mild heat which is increased gradually during the kneading operation, substantially as and for the purposes set forth.

2. An insulating composition, consisting of gum-rubber or caoutchouc and carnauba-wax combined together, in about the proportions stated, by kneading under the influence of a mild heat, substantially as and for the purposes set forth.

3. The method of making an insulating composition, which consists in first subjecting gum-rubber or caoutchouc and vegetable wax, to a kneading operation under the influence initially of a mild heat, and in then increasing said heat during the kneading operation, to convert said mass into a composition of a plastic nature, substantially as and for the purposes set forth.

In testimony whereof I have hereunto set my signature in the presence of two subscribing witnesses.

ADOLF GENTZSCH.

Witnesses:
ALVESTO S. HOGUE,
AUGUST FUGGER.